Aug. 14, 1962            G. L. BORELL            3,049,668
INDICATOR
Filed March 30, 1960            2 Sheets-Sheet 2
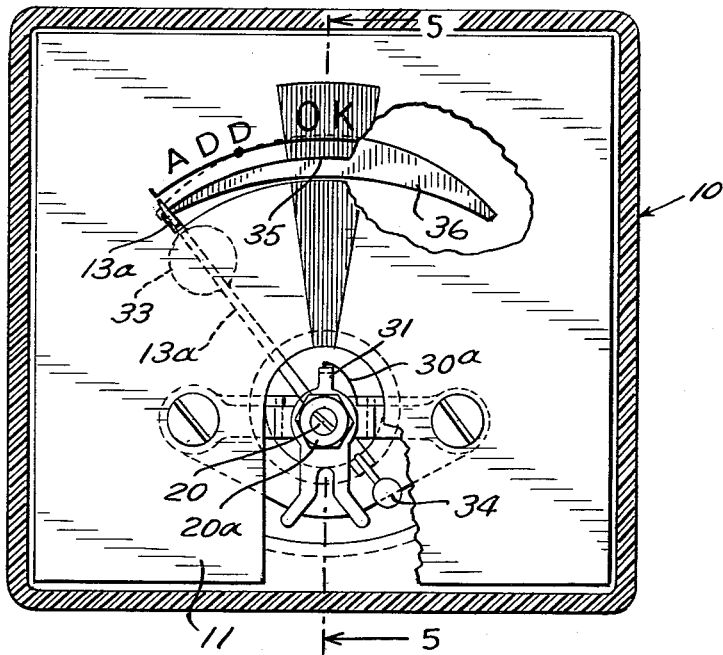
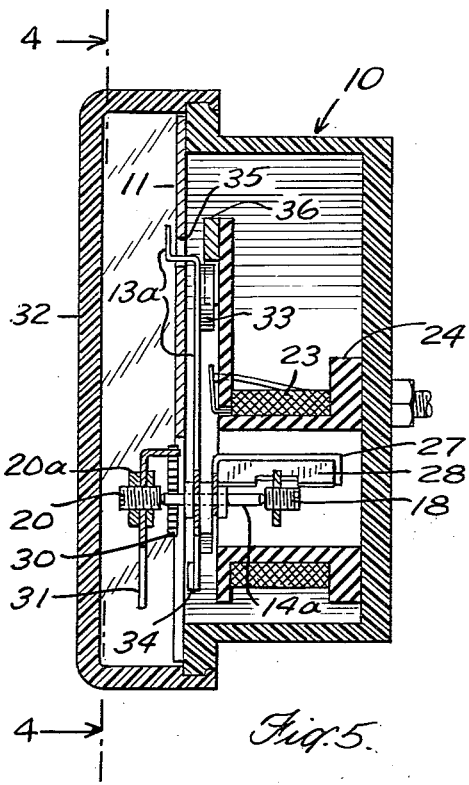
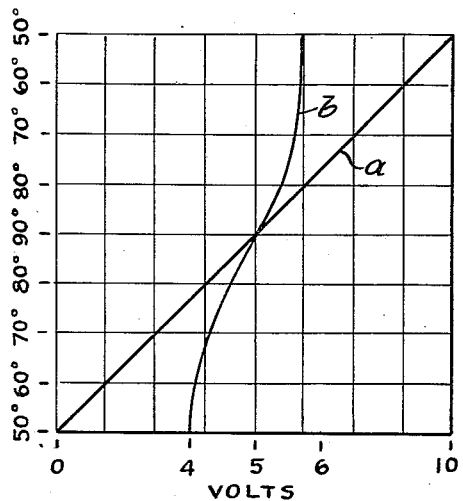
Inventor
GEORGE L. BORELL
By Borel & Borel
Attorneys

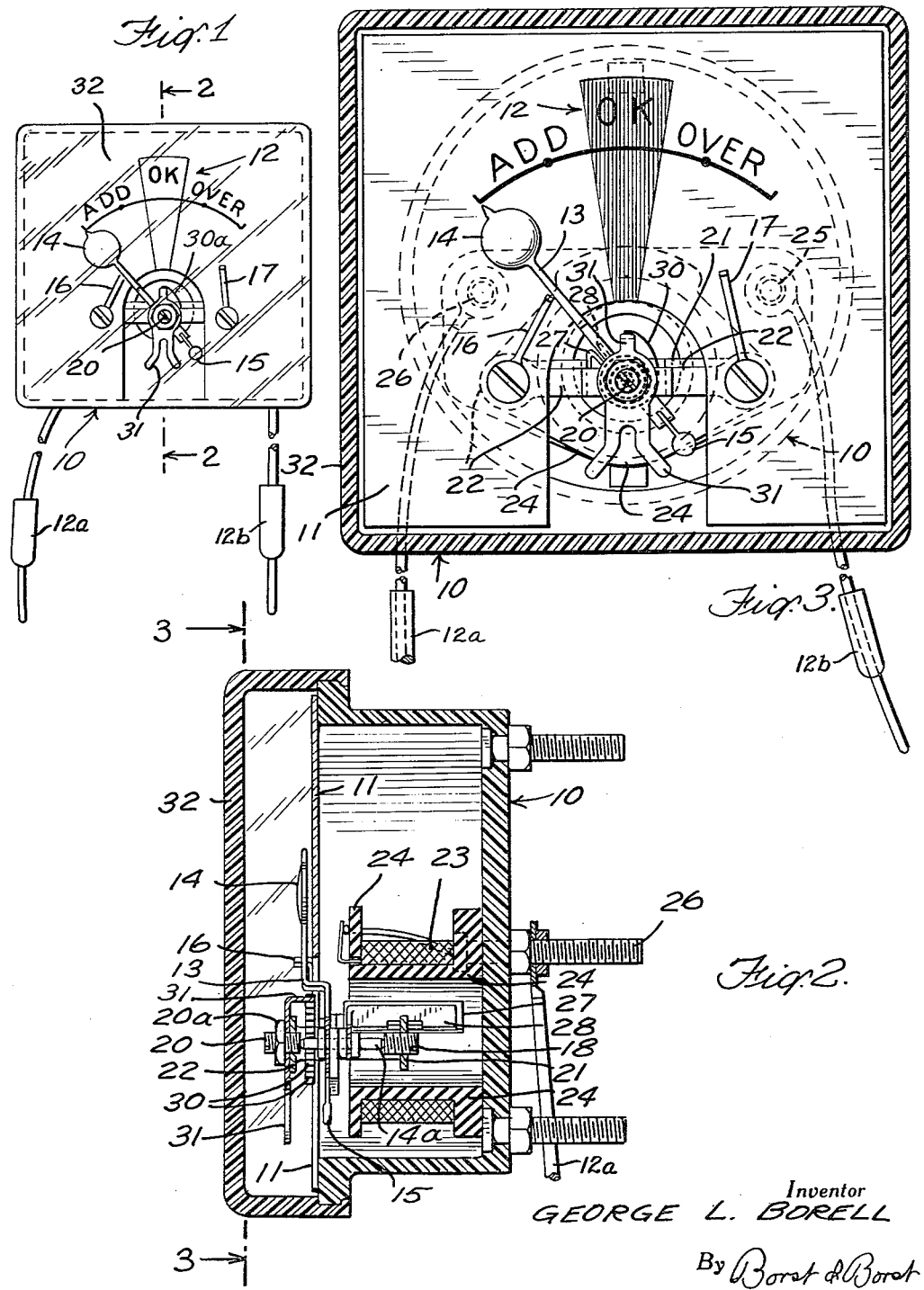

United States Patent Office 3,049,668
Patented Aug. 14, 1962

3,049,668
INDICATOR
George L. Borell, Glen Rock, N.J. (% Almo Laboratories Co., Inc., 424 Madison Ave., New York, N.Y.)
Filed Mar. 30, 1960, Ser. No. 18,532
2 Claims. (Cl. 324—132)

This invention relates to indicators and particularly to indicators of the scale and hand pointer type which are presently employed in computers and systems for indicating and measuring physical and electromagnetic phenomena.

Wherever measuring systems are in use today, their output is frequently indicated by a calibrated device in which there is provided a scale and a hand or pointer mounted to move over the scale. The pointer is ordinarily arranged to move linearly in response to its source of actuation and to provide thereby, in conjunction with the calibrated scale, data information relative to the output magnitude of the measuring system which may consist merely of circuit components responsive and critically located with respect to some physical phenomena such as temperature, velocity, concentration, etc. It is often the case that specific levels or ranges of this information is of special interest and that some action is to be taken when the indication moves away from that level or range. It is the fact rather than the exact extent to which it has been so removed which may be critical and it is necessary that the indicator be kept under fairly continuous and close observation if appropriate and opportune action is to be taken when the fact occurs so as to maintain conditions as close to optimum as possible. It should be a recognized desideratum, therefore, that there be provided a pointer type indicator which behaves differently outside the critical area of information than within so that the indicated fact of its being outside can be made visually pronounced. To this end, the present invention contemplates an indicator having a hand pointer with a selectively controlled bias which is minimal within the critical information area and progressively more effective outside thereof. Assuming a fixed ratio between the desired scale reading and a particular signal input applied to the indicator, it is the effect of the bias to alter the ratio of response so that varying increments of change in signal strength will affect the indicator readings in an accelerated manner and not in direct proportion to the percentage of signal change. The bias on the pointer is separate and independent of the pointer actuating means and may oppose or augment the effect of the latter when it takes effect to provide a suitable degree of expanded scale operation. In one specific embodiment of invention, this bias is provided by gravity pull on the free end of the pointer which is formed as an inverted pendulum and in another embodiment by a controlled magnetic attraction on this end of the pointer which is so balanced as to eliminate gravity effect.

One object of the invention is to provide an improved indicator of the hand pointer type which provides exaggerated pointer action in preselected regions of movement in accordance with its inherent mode of operation.

Other objects and advantages of the invention may be appreciated on reading the following detailed description which is taken in conjunction with the accompanying drawings, in which—

FIG. 1 is a front view in elevation of the improved indicator,

FIG. 2 is an enlarged section taken on line 2—2 of FIG. 1,

FIG. 3 is a front section taken on line 3—3 of FIG. 2,

FIG. 4 is a vertical elevation of a modified construction of the improved indicator taken on line 4—4 of FIG. 5, FIG. 5 is a side section taken on line 5—5 of FIG. 4, and FIG. 6 illustrates a plotted relation between position angle of the pointer hand and applied voltage for both conventional and improved indicators.

Referring to FIG. 1, the inverted pendulum indicator 10 is provided with a dial 11 having a scale 12. The indicator 10 is vertically mounted and is especially designed to be used with conductivity cells or electrodes 12a and 12b to yield information relating to the conductivity of a solution in which the cells or electrodes are immersed. To this end there is imprinted on the scale 12, three scale ranges, namely Add, OK and Over, which is intended to indicate to the viewer whether or not there is an excess of or a need for additional electrolyting material in the conducting solution. A hand pointer 13 having a weight 14 mounted on its free end is arranged to pivotally position itself relative to the scale in accordance with the energization of a field. The hand pointer 13 has a small counterweight 15 at its other end, this counterweight being insufficient to balance the weight or bob 14 so that the pointer 13 is formed as an inverted pendulum and may be expected to behave in the manner of such a pendulum. Pointer stops 16 and 17 are attached to the dial 11 to prevent the pointer 13 from exceeding the extreme scale positions.

Referring to FIG. 2, it is seen that the hand pointer 13 is mounted on a shaft 14a which is in turn mounted in an adjustable end bearing 18 and an adjustable end bearing 20, the latter being locked in its adjusted position by a locknut 20a. The bearings 18 and 20 are supported in brackets 21 and 22. Field windings 23 are arranged on an insulating spool 24 which is supported by the back plate of the housing for the indicator 10. The winding 23 is energized by input and output connections 25 and 26 which are led in through the back of the housing for the indicator 10. Within the insulating spool, there is mounted a fixed vane 27 on the bracket 21 and a movable vane 28 carried by the shaft 14a and is so positioned within the field produced by the windings 23 and the fixed vane 27 that the two vanes have the same polarity. On energization of the field, the movable vane 28 is caused to be repelled by the fixed vane so that the shaft 14a is caused to rotate clockwise as viewed in FIGURES 1 and 2 and pivot its mounted hand pointer over the scale. Also mounted on the shaft 14a at the dial 11 within the indicator housing is a counter-torque spiral spring 30, the outer end 30a of which is fixed to a bifurcated member 31 carried by the bracket 22 outside the indicator housing, opposing clockwise motion of the shaft. The dial and pointer are protected by a transparent member 32 which is also supported by the indicator housing in such position that the pointer and scale may be seen and yet be protected from damage.

As previously mentioned, the ordinary volt meter having conventional pointer action is a linear response indicating device whereby the movement of the pointer moves proportionally to the voltage applied to its field winding, this linear relation being indicated by the essentially straight line $a$ in the plotted pointer angle versus applied volts graph shown in FIG. 6. The present indicator operates in a manner indicated by the curved line $b$ shown in FIG. 6. It is seen that the pointer does not begin to move until four volts is reached and then pivots non-linearly until it reaches the mid volt region where the pointer moves quite linearly and then with increased voltage moves quickly to the extreme end of the scale. It is to be noted that the pointer is positioned at the high voltage side of the scale at about six volts. The mid region of the scale is assumed to be the critical region and the indicator is intended to afford instant and readily detected information when the pointer is outside that region. Although positioned by the same energizing torque as the standard meter, the pointer is thus caused to behave as a result of the gravity bias exerted by the weight 14 of the inverted pendulum pointer. Due to this weight, the pointer responds substantially in accordance with the cosine function throughout its movement as an inverted pendulum. However, the gravity bias on the pointer, when it is near the vertical position, is so nominal that the pointer can be expected to move in a substantially linear manner as it approaches and departs therefrom, being positioned primarily by the counter torquing forces exerted by the movable vane 28 and spiral spring 30. On either side of center, the additive or subtractive forces of the inverted pendulum weight 14 will bias the position of the pointer to accentuate the deviation from the center position. In operation, the indicator is arranged so that the pointer is normally at or near vertical position labeled OK on the dial of the indicator. If the indicator is being employed, for example, to afford indication of liquid conductivity, conduction through the liquid being establshed by some electrolytic material such as a detergent, the pointer will move at an increased rate to one end of the scale or the other when the conductivity as governed by liquid concentration is either insufficient or excessive. Assuming this same example, the indicator readily informs the viewer when conductivity is insufficient and material must be added or is too high indicating that material has been introduced into the solution over the desired amount, thus allowing quicker perception and closer control of the solution.

FIGS. 4 and 5 illustrate another embodiment of my invention, namely a magnetic-biased indicator. The pointer 13a of this indicator is balanced by means of a ferrous magnetic tip 33 at its free end and a counterweight member 34 attached below its pivot point and at the other end. The pointer extends through a slot 35 in the dial which is located near its free end and mounted over the slot inside the housing for the indicator is an arcuate shaped permanent magnet 36, the heavily magnetized ends of which act on the tip 33 which serves in effect as an armature. The indicator provides magnetic bias in lieu of gravity bias which is, of course, effective regardless of the mounted position of the indicator. The magnet and the armature of the indicator is arranged so that the pointer will behave similarly to the gravity biased indicator above described and will move in a pattern indicated by the curve b in FIG. 6. The advantage of the magnetic bias indicator is that it is not limited to vertical mounting as is the case of the gravity biased indicator and may, therefore, be borne on mobile units which are subjected to pitch and roll.

Various other embodiments of the invention may be effected by persons skilled in the art without departing from the principle and scope of invention as defined in the appended claims.

What is claimed is:

1. An indicator comprising a dial having an indicia scale superposed thereon, a vertically mounted pointer arranged to move pivotally over the face of said dial and orient itself with respect to said indicia scale, means for actuating the movement of said pointer, said pointer extending upwardly from its pivotal axis and having a weight mounted thereon substantially closer to its free end than its pivotal end whereby an inverted pendulum effect is imparted thereto throughout its pivotal movement.

2. An electrical measuring instrument comprising a scale, a moving system gravity biased to a position of rest and which includes a vertically and pivotally mounted pointer extending upwardly from its pivotal axis deflectable over said scale from said rest position in accordance with the amplitude of the electrical quantity to be measured, a weight coupled to said pointer substantially closer to its free end than to its pivotal end and arranged to exert, independently of said electrical quantity, an increased pointer deflecting torque or bias on each side of a given region of pointer positions relative to said scale whereby there is provided relative scale expansion on either side of said given region.

References Cited in the file of this patent
UNITED STATES PATENTS

| | | |
|---|---|---|
| 1,962,849 | Tour | June 12, 1934 |
| 2,658,179 | Eadie | Nov. 3, 1953 |
| 2,671,208 | Lamb | Mar. 2, 1954 |
| 2,774,843 | Kenick | Dec. 18, 1956 |
| 2,926,305 | Fellerman | Feb. 23, 1960 |